(No Model.)
J. A. KIMBALL.
TABLE WARE.
No. 381,795. Patented Apr. 24, 1888.
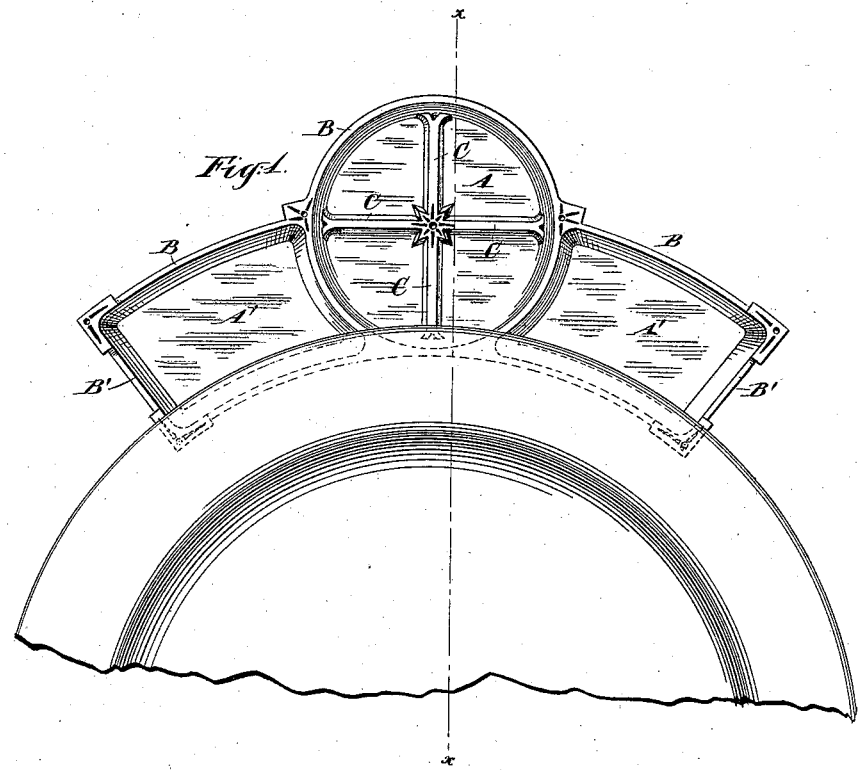
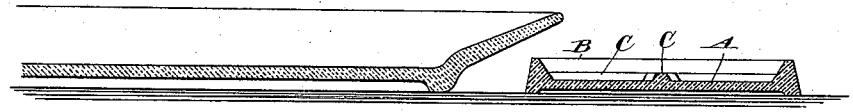
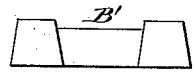
Witnesses:
Charles W. Searle,
Florence A. Richmond.
Inventor:
J. Albert Kimball
by his attorney
Thomas Drew Stetson

UNITED STATES PATENT OFFICE.

J. ALBERT KIMBALL, OF NEW YORK, N. Y.

TABLE-WARE.

SPECIFICATION forming part of Letters Patent No. 381,795, dated April 24, 1888.

Application filed November 10, 1886. Serial No. 218,591. (No model.)

*To all whom it may concern:*

Be it known that I, J. ALBERT KIMBALL, of New York city, in the county and State of New York, have invented a certain new and useful Improvement in Table-Ware, of which the following is a specification.

Many efforts have been made to provide plates with accompanying vessels adapted to receive refuse. The conditions required are peculiar. I have devised and reduced to practice a dish which fulfills the required conditions. It is an elongated shallow vessel adapted to match against and under the rim of an ordinary plate, but remaining separate therefrom. It is of sufficient width to receive bones of fish or fowl, and the refuse of potatoes, fruit, and the like during a meal. The ends are favorably formed and presented to receive and support the knife and fork. In what I esteem the most complete form of the invention, the middle is equipped for receiving a cup or goblet. Resting a filled vessel on my dish in such manner not only protects the table-cloth against any moisture from such vessel, but, by adding weight to the dish, fulfills an important function in aiding it to maintain its place.

The accompanying drawings form a part of this specification.

Figure 1 is a plan view of my device with a portion of an ordinary plate with which it is adapted to serve. Fig. 2 is a cross-section on the line $x$ $x$ in Fig. 1. Fig. 3 is an end elevation.

Similar letters of reference indicate corresponding parts in all the figures where they occur.

The dish is made in the curved form represented. It may be of white crockery, porcelain, or any other suitable material. Pressed glass may serve. The bottom of the central portion, A, is round. It is surrounded by a rim, B, and crossed by shallow ridges C. Attached to A, and forming one dish therewith, are wings A' A', so formed and attached that the whole dish presents a curved contour adapted to match against the rim of a common dinner or breakfast plate. It is made so low that it will extend under the edge of the plate. The rim B is extended also along the outer and inner edge of these wings. The rim also extends across the outer end of each of these wings; but it is still lower at these points, as indicated at B'.

My dish may serve a great variety of uses; but it is pre-eminently adapted to match under or near the edge of a plate to receive refuse and to support a knife or fork. Whenever it is desired to lay the latter down, they rest in the depressions B' at the ends of the wings A'.

The central portion, A, may hold a cup or tumbler. One of the wings A' may be devoted to refuse from the plate, while the other contains salt for dipping celery, or any other material for use. Its broad base and the considerable weight is of advantage in properly holding butter, especially in cold weather, not requiring the dish to be held in supplying or in taking away butter.

I attach importance to the fact that my dish, by its provision A B C for holding a cup or the like in the center, removes the offensive suggestiveness, which would pertain to a dish intended and adapted for refuse alone. My dish appears a proper article for table use, and its suggestions are pleasant and cleanly.

I claim as my invention—

1. A refuse-holder for table use, provided with a circular portion, A, having a rim, B, and cross-ridges C, and wings A', all adapted to serve both as a refuse-holder and a goblet-holder, as herein specified.

2. A dish for use auxiliary to a dining-plate, but separate therefrom, having a curved form and adapted to match under the edge of a dining-plate, and provided with knife and fork holding depressions B' at the ends, as herein specified.

In testimony whereof I have hereunto set my hand, at New York city, this 6th day of November, 1886, in the presence of two subscribing witnesses.

J. ALBERT KIMBALL.

Witnesses:
CHARLES R. SEARLE,
M. F. BOYLE.